US012632230B1

(12) United States Patent
Hunter et al.

(10) Patent No.: US 12,632,230 B1
(45) Date of Patent: May 19, 2026

(54) BUILDING APPLICATION MODULES AND SOLUTION TEMPLATES FOR APPLICATION DEPLOYMENT ACROSS CLIENT RESOURCES

(71) Applicant: Amazon Technologies, Inc., Seattle, WA (US)

(72) Inventors: Jamie Hunter, Kingston, WA (US); Mazen Sami Labban, San Diego, CA (US); Robert Frank Marano, Darien, CT (US); Rohit Dilip Rangnekar, Pleasanton, CA (US); Manish Nirmal Talreja, River Edge, NJ (US); Davinder Singh Sawhney, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 18/469,429

(22) Filed: Sep. 18, 2023

(51) Int. Cl.
*G06F 8/36* (2018.01)

(52) U.S. Cl.
CPC ..................................... *G06F 8/36* (2013.01)

(58) Field of Classification Search
None
See application file for complete search history.

(56) References Cited

U.S. PATENT DOCUMENTS

| | | | | | |
|---|---|---|---|---|---|
| 6,700,590 | B1 * | 3/2004 | DeMesa | .................. | G06Q 10/06 709/224 |
| 6,996,801 | B2 * | 2/2006 | Yoneyama | ................ | G06F 8/30 717/112 |
| 9,116,771 | B2 | 8/2015 | Hoy | | |
| 9,665,351 | B2 | 5/2017 | Amulu | | |
| 10,162,619 | B1 * | 12/2018 | Lanner | ...................... | G06F 8/61 |
| 10,262,019 | B1 | 4/2019 | Reiner et al. | | |
| 11,218,518 | B2 | 1/2022 | Amento et al. | | |
| 11,544,050 | B1 | 1/2023 | Ankit | | |
| 2002/0095491 | A1 * | 7/2002 | Edmonds | .............. | H04L 67/025 709/224 |
| 2004/0006762 | A1 * | 1/2004 | Stewart | ..................... | G06F 8/36 717/106 |

(Continued)

OTHER PUBLICATIONS

Tkaczyk, "Cataloging design patterns for Internet of Things artifact integration", 2018, IEEE (Year: 2018).*

(Continued)

*Primary Examiner* — Hossain M Morshed
(74) *Attorney, Agent, or Firm* — Robert C. Kowert; Kowert, Hood, Munyon, Rankin & Goetzel, P.C.

(57) ABSTRACT

A solution builder service allows builder clients to build modules and solution templates for application deployment and also allows consumer clients to select solution templates for deployment of an application. The service may receive, from a builder, software code to be included in an application module and generate a module based on the code. After validation, the service adds the module to a catalog. The service may receive, from the builder, a solution template that indicates application module(s) of the catalog that are to be used for deployment of an application (e.g., solution). After validation, the service adds the template to the catalog. The template becomes available for selection and configuration by a consumer, which can be used to deploy an application to the consumer's resources.

20 Claims, 10 Drawing Sheets

(56) References Cited

U.S. PATENT DOCUMENTS

| | | | | |
|---|---|---|---|---|
| 2009/0037875 A1* | 2/2009 | Jones | G06F 8/34 | |
| | | | 717/109 | |
| 2010/0050169 A1 | 2/2010 | Dehaan | | |
| 2010/0153150 A1* | 6/2010 | Prigge | G06Q 10/06 | |
| | | | 707/E17.05 | |
| 2010/0153920 A1* | 6/2010 | Bonnet | G06F 8/36 | |
| | | | 717/122 | |
| 2010/0180255 A1 | 7/2010 | Chung | | |
| 2010/0318968 A1* | 12/2010 | Traut | G06F 8/36 | |
| | | | 717/122 | |
| 2014/0096107 A1* | 4/2014 | Ravel | G06F 8/70 | |
| | | | 717/107 | |
| 2014/0237446 A1* | 8/2014 | Sanchez | G06F 8/36 | |
| | | | 717/109 | |
| 2015/0205602 A1* | 7/2015 | Prismon | G06F 9/44505 | |
| | | | 717/121 | |
| 2017/0147335 A1 | 5/2017 | Parees | | |
| 2017/0277390 A1* | 9/2017 | Chang | G06F 3/04817 | |
| 2018/0089071 A1 | 3/2018 | Keskitalo | | |
| 2020/0201625 A1 | 6/2020 | Kryzhanovsky | | |
| 2021/0089281 A1* | 3/2021 | Smith | G06F 8/315 | |
| 2021/0091998 A1 | 3/2021 | Ellis | | |
| 2021/0117164 A1 | 4/2021 | Buck | | |
| 2021/0342130 A1* | 11/2021 | Sanchez | G06F 8/38 | |
| 2022/0286531 A1 | 9/2022 | VanAntwerp | | |
| 2022/0303271 A1 | 9/2022 | Elsherif | | |
| 2023/0229412 A1* | 7/2023 | Paravatha | G06F 8/36 | |
| | | | 715/771 | |
| 2023/0409290 A1* | 12/2023 | Duggal | G06Q 10/06311 | |
| 2024/0113948 A1* | 4/2024 | Gupta | G06Q 30/016 | |
| 2024/0232294 A1* | 7/2024 | Inavalli | G06F 18/214 | |
| 2024/0248693 A1 | 7/2024 | Ma | | |
| 2024/0264812 A1* | 8/2024 | Ding | G06F 8/36 | |
| 2024/0281359 A1* | 8/2024 | White | G06F 11/3409 | |

OTHER PUBLICATIONS

U.S. Appl. No. 18/469,484, filed Sep. 18, 2023, Jamie Hunter, et al.

* cited by examiner

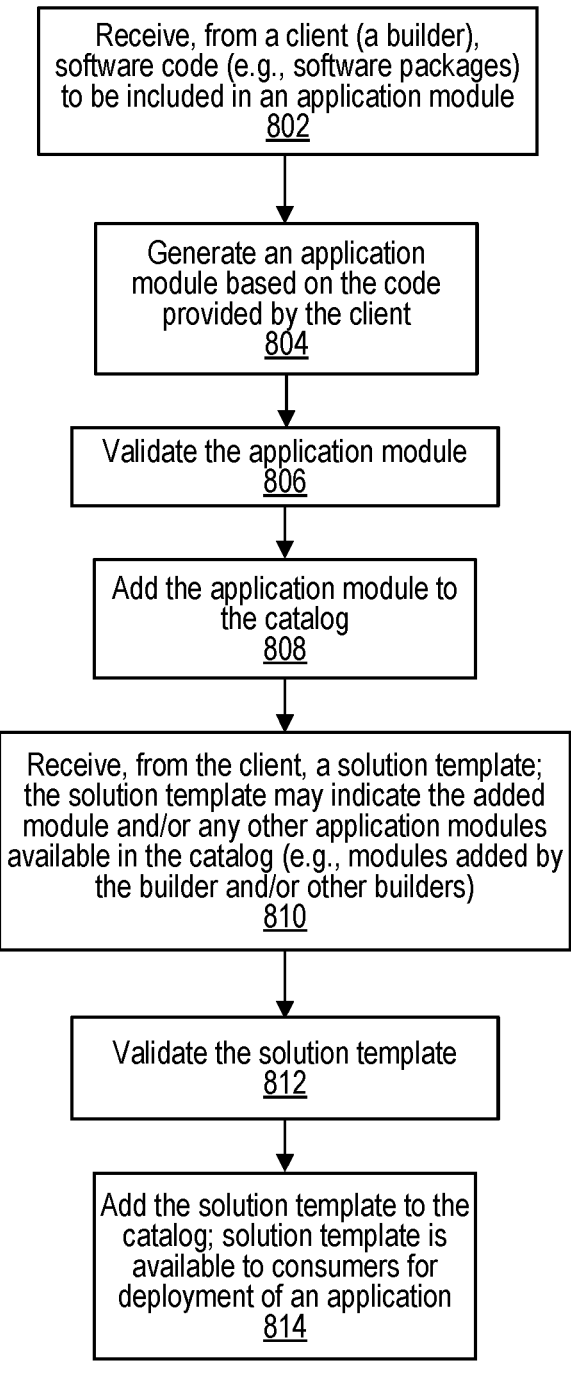

Receive, from a client (a builder), software code (e.g., software packages) to be included in an application module
802

Generate an application module based on the code provided by the client
804

Validate the application module
806

Add the application module to the catalog
808

Receive, from the client, a solution template; the solution template may indicate the added module and/or any other application modules available in the catalog (e.g., modules added by the builder and/or other builders)
810

Validate the solution template
812

Add the solution template to the catalog; solution template is available to consumers for deployment of an application
814

FIG. 8

BUILDING APPLICATION MODULES AND SOLUTION TEMPLATES FOR APPLICATION DEPLOYMENT ACROSS CLIENT RESOURCES

BACKGROUND

The Internet of Things (IoT) is a phrase given for the interconnection of computing devices scattered around the globe within the existing internet infrastructure. A client of a remote service provider may use IoT devices (also referred to herein as edge devices) to collect data (e.g., video data, sensor measurements) and to send the data to the service provider for processing by one or more services of the service provider's network. In order to provision cloud resources and various IoT devices, a user may be required to perform many different tasks (download software from the service provider, install software on the edge device, configure communication and security settings, etc.). This may consume a large amount of human resources as well as various communication resources. The provisioning/deployment process can be quite burdensome, error-prone, and time-consuming, particularly for clients that use large numbers of IoT devices and/or different cloud services.

BRIEF DESCRIPTION OF THE DRAWINGS

FIG. 8 is a high-level flowchart illustrating various methods and techniques for building modules and solution templates for application deployment, according to some embodiments.

Figure 1:
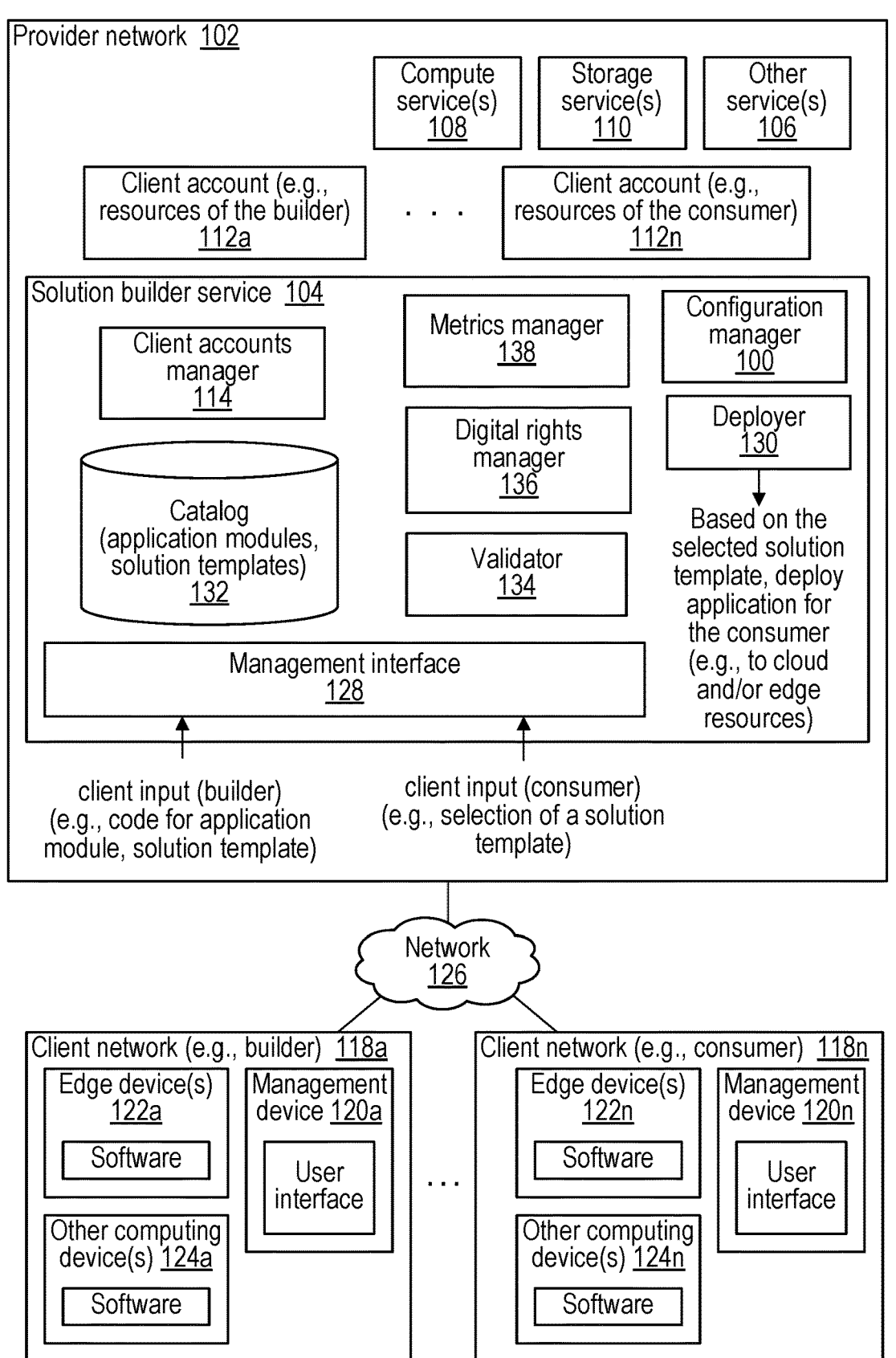
FIG. 1 is a logical block diagram illustrating a system for building modules and solution templates for application deployment and for selecting a solution template for deployment of an application, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for building application modules and solution templates for application deployment and for selecting a solution template for deployment of an application, according to some embodiments. In embodiments, a solution building service of a service provider network may be used by any number of different clients (e.g., builders and/or consumers) for deployment of an application. In embodiments, a builder client may be a client of the solution building service that builds, provides, and/or defines application modules and/or solution templates, which can be added to a catalog as described herein. In embodiments, a consumer client may be a client of the solution building service that selects a solution template for deployment of an application as described herein. In some embodiments, a given client may be both a builder client and a consumer client.

Building modules and solution templates for application deployment and selecting a solution template for deployment of an application, as described herein, may be less burdensome, error-prone, and/or time-consuming than developing and deploying applications using traditional techniques. Furthermore, fewer human resources and/or communication/computing resources may be used to build and to deploy an application, compared to traditional techniques. For example, any number of application modules and/or solution templates may be selected, re-used, and/or modified in order to build and deploy an application to client resources. In various embodiments, the use of reusable and integratable application modules and solution templates may reduce the complexity, time, and/or amount of manual labor required compared to traditional techniques, in order to create an end-to-end, IoT-based solution for businesses (e.g., through the availability of commonly required software functionality). In embodiments, a catalog of such application modules and/or solution templates is available to obtain/purchase (e.g., via a marketplace, database, or other service), providing a self-service solution to build/accelerate the creation of IoT solutions.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for building modules and solution templates for application deployment and for selecting a solution template for deployment of an application. A number of different methods and techniques for building modules and solution templates for application deployment and for selecting a solution template for deployment of an application are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for building modules and solution templates for application deployment and for selecting a solution template for deployment of an application, according to some embodiments.

As shown, a provider network 102 includes a solution builder service 104 that implements building modules and solution templates for application deployment and implements selecting a solution template for deployment of an application (e.g., allowing a client to select a solution template as described herein). In embodiments, the application may be deployed to any number of resources of a client in order to provide a solution that meets the client's desired functionality (e.g., deployed to the client's compute resources hosted at the provider network and/or compute devices/edge devices of the client's network). In the example embodiment, the provider network 102 also includes any number of other services 106, such as compute services 108 and/or storage services 110.

In embodiments, any of the compute, storage, and/or other functionality described for the solution builder service 104 may be provided, at least in part, by other services 106, compute services 108, and/or storage services 110. For example, a storage service 108 may maintain/store digital rights and/or a client account information for each client of the solution builder service 104. The provider network may also include any number of client accounts 112. In embodiments, a given client account may include any number of resources of the provider network that are managed/owned by a client of the provider network and/or the solution builder service. For example, client account 112a may include resources managed by client A of the solution builder service 104.

In the depicted embodiment, the solution builder service 104 includes a client accounts manager 114 that stores data for any number of clients of the service and manages activity for each client (e.g., access to the service, using functionality of the service). The solution builder service 104 also includes a digital rights manager 136 that may manage different types of access rights that are assigned to different clients, as described below.

In embodiments, any number of clients of the solution builder service 104 may each have one or more client networks 118, and a given client network may include at least one management device 120, any number of edge devices 122, and/or any number of other computing devices 124. For example, client network 118a of a client A includes management device 120a, edge devices 122a other computing devices 124a. In embodiments, clients of the solution builder service 104 may use the solution builder service 104 by communicating with the provider network 102 from a remote client network 118 of the corresponding client (e.g., via a wide area network 126, such as the internet).

As depicted, the solution builder service 104 includes a management interface 128 (e.g., a management API) that may receive client input (e.g., from a builder client or from a consumer client, described below) from a management device 120 of a remote client network 118 (e.g., via a user interface provided by a display of the management device 120, a command line interface, API commands or requests, etc.). In embodiments, a user may provide input via a graphical user interface or command line interface of the display.

For example, the management interface 128 may receive client input from a builder client that may include software code for an application module and/or a solution template, as described herein. In embodiments, a builder client may be a client that provides software code to be used to generate new application modules and/or a client that provides a solution template to be used for deployment of an application by the deployer 130. As another example, the management interface 128 may receive client input from a consumer client that may include selection of a particular solution template for deployment of an application, as described herein. In various embodiments, any given client of the service may be a builder client, a consumer client, or both a builder client and a consumer client (e.g., providing code and/or solution templates to be added to the catalog 132 as well as selecting solution templates for deployment of an application onto the client's resources).

In embodiments, a client (e.g., a builder client) may use the solution builder service 104 to generate application modules and/or to provide solution templates that may be used for application deployment (e.g., deployment of an application to computing resources of a consumer client). For example, the service may receive, from a client, software code to be included in an application module. In embodiments, the client may provide the code using any suitable technique (e.g., sending one or more files, one or more software packages, source code, etc.). The service may generate an application module based on the software code provided by the client. The service may then validate (e.g., using a validator 134) the application module (e.g., verify the syntax is correct, verify that the module will execute without errors/failures).

After the application module is validated (e.g., by validator 134), the service adds the application module to the catalog 132. In embodiments, the catalog stores any number of application modules that were generated based on code provided by any number of clients of the service. In various embodiments, the service may receive, from the client, an indication that the application module is to be rights managed. The client may indicate one or more types of access rights that can be assigned for the application module by the client. For example, the client may indicate an access right to view source code of any number of different portions of the module or the entire module. In embodiments, the client may indicate that the access right is to be granted to one or more clients of the service (e.g., certain partners that the client works with) or to any client of the service (e.g., any client that meets certain criteria, such as payment of a certain access right fee). As shown, a digital rights manager 136 may manage/store the types of access rights that have been granted to any number of clients, for any number of modules and/or solution templates.

In embodiments, a client (e.g., a builder client) may use the solution builder service 104 to provide a solution template. For example, the service may receive, from a client, a solution template. In embodiments, the client may provide the solution template using any suitable technique (e.g., sending a template file, editing a template file provided by the service, etc.). The service validates (e.g., using a validator 134) the solution template (e.g., verify the syntax is correct, verify that the modules indicated by the solution template exist and/or will execute without errors/failures).

After the solution template is validated, the service adds the solution template to the catalog 132. The solution template may be available for selection from the catalog for use at least by one or more of the clients of the solution builder service other than the builder client (e.g., the builder client and/or any number of other clients of the service may use the solution template, depending on whether the builder client assigned usage rights of the solution template to a given client). In embodiments, the catalog may store any number of solution templates that were provided by any number of clients of the service. In embodiments, any given solution template may indicate any number of the application modules of the catalog that are to be used for deployment of an application (e.g., as long as the builder of the given solution template has been granted the right to include the modules that are listed in the template). In embodiments, the catalog may be private within the builder's account (e.g., the modules and templates are only available to those users that belong to the builder's account). In some embodiments, the catalog may be a public marketplace/data source, making modules and templates available to any organization that purchases and/or has permission to obtain the modules and/or templates.

In various embodiments, the service may receive, from the client, an indication that the solution template is to be rights managed (e.g., as discussed above for an application module). The client may indicate one or more types of access rights to be assigned for the solution template by the client. For example, the client may indicate a right to view content of any number of different portions of the template or the entire template. In embodiments, the client may indicate that the access right is to be granted to one or more clients of the service (e.g., certain partners that the client works with) or to any client of the service (e.g., any client that meets certain criteria, such as payment of a certain access right fee).

In embodiments, a client (e.g., a consumer client) may use the solution builder service 104 to receive, from the client, selection of a solution template from among a plurality of solution templates available for selection. For example, the service may receive, from the client, selection of the template from a list of different templates available for selection or receive, from the client any other suitable input that identifies the template.

The service may also receive, from the client, configuration input indicating a configuration for the solution template. For example, the client may provide information to be used by the service to configure the template for deployment to the client's resources, such as the number and/or types of hardware resources/devices to deploy the application to (e.g., number and/or types of hardware/software resources at the provider network and/or number and/or types of hardware/software resources at the client network. In some embodiments, the service may validate the configuration input (e.g., verify there are no errors in the configuration input).

In embodiments, the service then configures the solution template based on the configuration input. In some embodiments, the service may validate the configured solution template (e.g., verify there are no errors in the configured template that may result in failure of deployment of the application to one or more hardware/software resources). Based on the configured solution template, the service may then deploy an application to any number of resources of the client (e.g., deploying one or more of the application modules indicated in the template to respective client resources indicated in the configuration template). In embodiments, a given client may select any number of different solution templates to deploy any number of applications to the client's resources using the same similar technique as described above (e.g., as long as the client has access rights to use the solution template).

In various embodiments, a client may by granted one or more types of access rights to one or more modules of a solution template (e.g., one or more of the modules listed/indicated in the template). In embodiments, the service may receive, from the client, a request for a type of access to one of the application modules of the solution template (e.g., request to view the source code of the module, or request to modify a configuration of the application module). Based on the type of access right assigned to the application module (e.g., source code viewing, module configuration) and/or whether the access right is granted to the particular client (e.g., source code viewing granted to the client, module configuration granted to the client), the service may provide the requested type of access to the client (e.g., display the source code to the client, configure the module based on the client's input).

In embodiments, any number of builder clients may each add modules and/or solution templates to the catalog, as described above. In some embodiments, after a given solution template has been added by a client to the catalog, the client and/or any number of other clients (e.g., consumer clients) may implement a solution based on the solution template. For example, the service may receive, from the consumer client, a request for deployment of the solution template and in response, the service may deploy an application to resources of the consumer client based on the solution template (e.g., after the consumer client configures the solution template for the consumer client's system).

In some embodiments, any number of the application modules and/or solution templates of the catalog may be a prebuilt module and/or template provided by the solution builder service/provider network. As described herein, for a given deployment, any number of application modules may be deployed to any number of edge devices of a client's remote network (e.g., IoT devices) and/or any number of the client's resources at the provider network (e.g., cloud resources/instances).

In various embodiments, a builder client may use a graphical user interface (GUI) or generative artificial intelligence (AI) interface provided by the solution builder service to define/specify a solution template. For example, the GUI may provide an indication of different application modules selected by the client to be included in the template, and the service may receive, from the client, input that indicates any number of relationships between different ones of the application modules (e.g., input from the client that directs one or more outputs of module A to one or more inputs of module B, such as drawing a line that connects the output(s) to the input(s)). This may allow users to create solution templates, even though they may have little or no knowledge about coding or other technical aspects. In some embodiments, a builder client may use a generative artificial intelligence (AI) interface provided by the solution builder service to define/specify a solution template. For example, the builder client may provide text input, voice input, and/or images that describe a desired functionality/solution, and the service may create a solution template that indicates any number of application modules and/or any number of relationships between different ones of the application modules.

In some embodiments, the service may receive, from a consumer client, a support request for an application that has been deployed based on a solution template (e.g., a request to correct a bug or request for assistance to operate the application). In response, the service may route the support request to the builder client that originally created/added the template to the catalog and/or to another endpoint of the service provider network (e.g., a support service). The builder client and/or the service provider network may then respond with information to address the support request.

In some embodiments, the service (e.g., metrics manager 138) may receive performance metrics for the application (e.g., from the client's cloud resources and/or edge devices) and route the performance metrics to the client, to the builder client that originally created/added the template to the catalog, and/or to another endpoint of the service provider network (e.g., a support service). This may allow the client, the builder client, and/or the service provider to monitor the performance of the deployed application. In some embodiments, the metrics manager 138 configures, receives, and/or processes metering telemetry/metrics received by application(s) (e.g., applications deployed to a client's resources based on application modules and/or solution templates). In embodiments, once an application has been deployed and is operating within the a client's account (e.g., on the service provider network), the usage of the application (e.g., usage of application modules and/or solution templates) generates usage data which is transmitted back to the metrics manager 138 (e.g., via metering telemetry) for processing and upstream billing by the service provider to the client (e.g., to the buyer client/customer).

Figure 2:
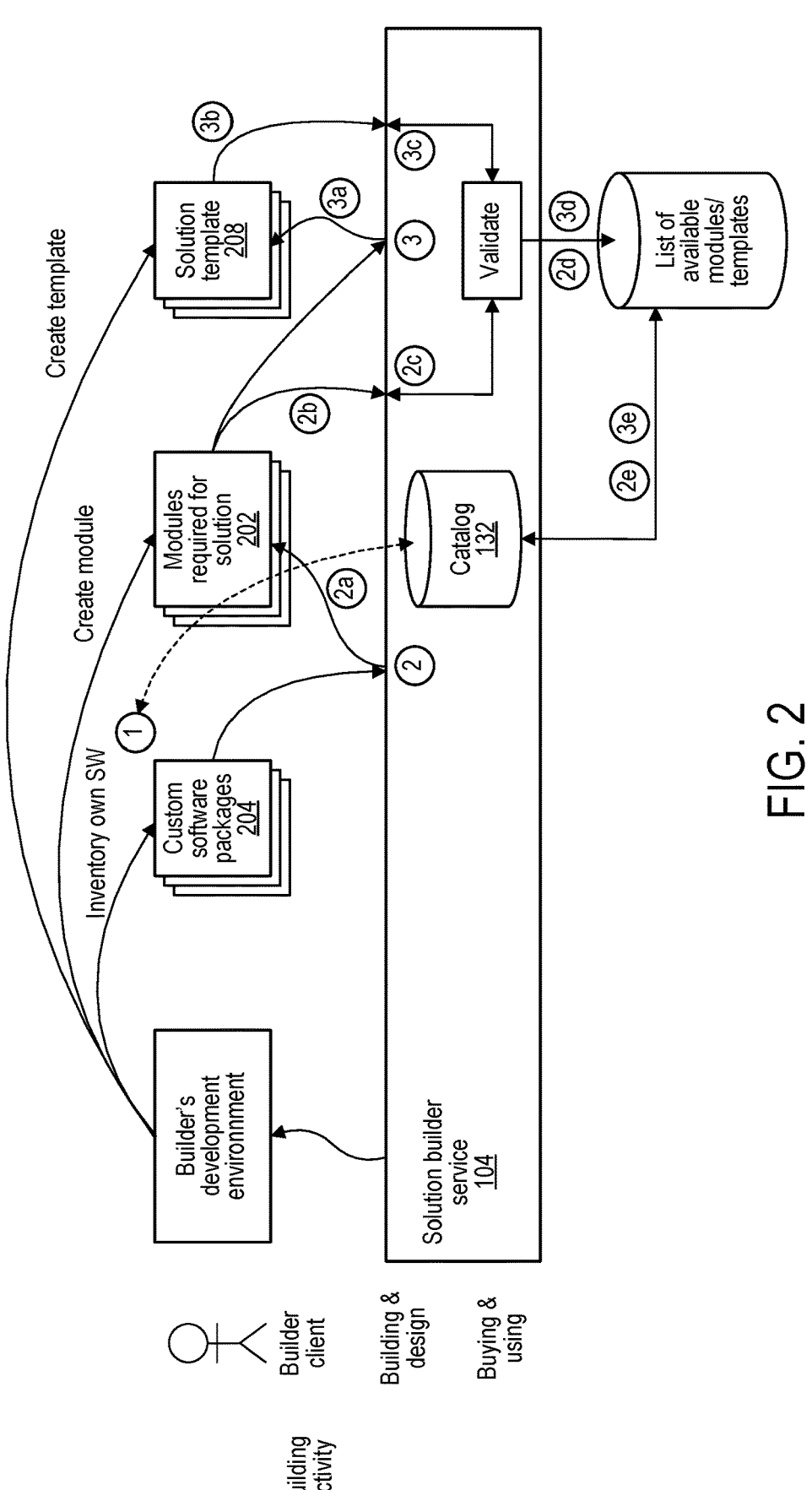
FIG. 2 is a logical block diagram illustrating a system for building modules and solution templates for application deployment, according to some embodiments.

FIG. 2 is a logical block diagram illustrating a system for building modules and solution templates for application deployment, according to some embodiments.

In some embodiments, the solution builder service may be integrated into the builder client's development environment and processes. The client (e.g., any number of users such as developers, designers, etc.) may design a solution to be implemented across the client's resources. This may include taking an inventory on existing software code (e.g., software packages) that the client has already developed. In embodiments, the client may check the solution builder service catalog (1) to see if there is an existing solution template at the service that may be used as a base for the client's solution and/or may if the required application module(s) exist. If not, then the client will use the service to create the required modules and/or the solution template to be used to deploy the application to implement the solution.

The client may use the solution builder service to create the one or more application modules 202 that will be used for the solution (2). To create a new application module, the client may provide code. In embodiments, the client may provide any number of custom software packages 204 to be included as part of the new module. The client may verify/test functionality of the new module against the client's function requirements (2a).

As shown, the client may then submit to the service the newly written and verified module for validation (2b). The service performs validation of each submitted module (2c). In embodiments, the service may coordinate with other service(s) to add the module to a list of available modules and/or solution templates provided by the service or the other service(s) (2d). The service may also add the new module(s) to the catalog of the service (2e).

In the depicted example, the client may collect and/or indicate the required modules for the solution and create a solution template 208 based on the intended solution (3). The client completes the solution template and may verify/test functionality of the new template against the client's function requirements (3a).

The client may then submit to the service the newly written and verified template for validation (3b). The service performs validation of the template (3c). In embodiments, the service may coordinate with other service(s) to add the module to a list of available modules and/or solution templates provided by the service or the other service(s) (3d). The service may also add the new template to the catalog of the service (3e).

Figure 3:
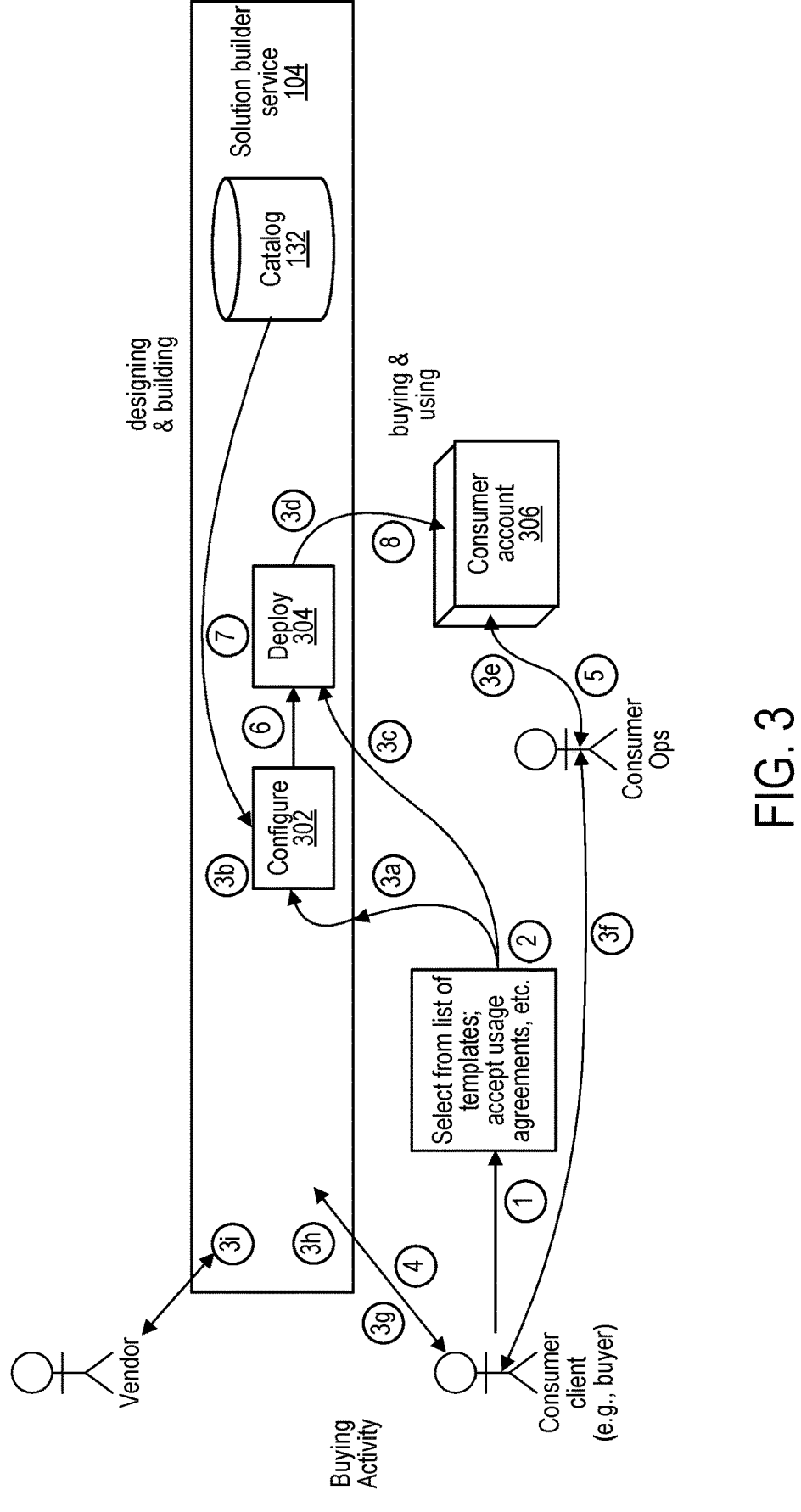
FIG. 3 is a logical block diagram illustrating a system for selecting a solution template for deployment of an application, according to some embodiments.

FIG. 3 is a logical block diagram illustrating a system for selecting a solution template for deployment of an application, according to some embodiments.

As shown, a consumer client (e.g., a buyer/user) may decide to deploy 304, evaluate, and/or purchase a solution (e.g., an application to be deployed to their resources; (1)). The client may initiate evaluation of a solution template using the solution builder service or other service (e.g., selecting from a list of available templates, accepting any usage/evaluation agreements; (2)).

The client may be directed to an interface (e.g., GUI or generative AI) to configure 302 the selected template (3a). The client may configure the template for their resources/environment and the service may alert the client when the template is ready/configured (3b). The client may initiate deployment of the application into their account 306/resources based on the configured template (3c). The solution builder service may orchestrate the provider network resources and/or remote client resources (e.g., edge devices) to execute the solution logic. The client evaluates the solution for an amount of time (e.g., according to the evaluation agreement; (3e)).

The consumer operations user of the client may then render an evaluation decision to the client/buyer (3f). If the client decides not to use/purchase the solution template, then the decision may be recorded by the service (3g), the service tears down/removes one or more of the client resources associated with the template, and/or the service may provide information to the client that indicates the amount of usage and/or billing amount for the evaluation of the template.

In some embodiments, the software code received by the client that is to be included in an application module may include metering logic in order to generate usage data in a time series telemetry stream (e.g., collected by devices/sensors at the client's site and sent to metrics manager 138). In some embodiments, the client may also define within meta data of the application module and/or the solution template the pricing parameters per module and/or per template to be used with the metered telemetry stream by the solution building service, which may be used to generate the cost of the Customer/Buyer's bill.

If the client decides to continue using the solution/deployed application (4), then the consumer operations user of the client continues to use the solution as is (5). In embodiments, the buyer may reconfigure and/or redeploy some or all of the application, and may expand the use of the solution/application across one or more other operations of the client (6). The client may redeploy (7) and expand the solution/application for use across the client's business operations (8).

Figure 4:
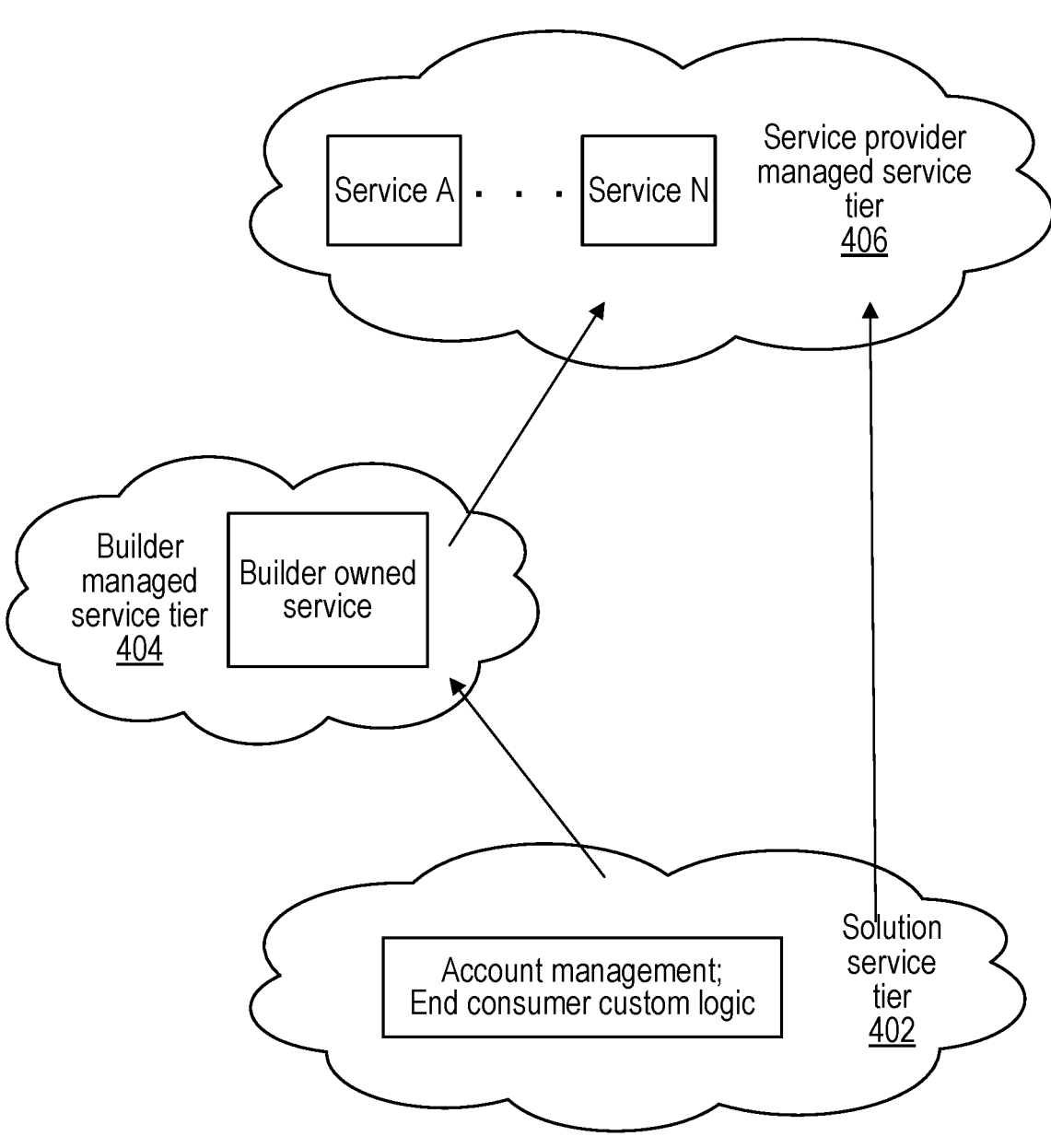
FIG. 4 is a logical block diagram illustrating different types of deployments, according to some embodiments.

FIG. 4 is a logical block diagram illustrating different types of deployments, according to some embodiments. The diagram depicts some examples of relationships among cloud and edge functionalities that may be used to operate application modules and/or solution templates.

In various embodiments, services that are application modules and/or are used by deployed application modules may be run in an account managed by an individual buyer client in a solution service tier 402, may be run in an account managed by a builder for the buyer client in a builder managed service tier 404 (e.g., compute resources of the service provider network that are owned/managed by a builder client and made available to a consumer client as software as a service (SaaS)), or the service may be managed by the service provider network in a service provider managed service tier 406. In a solution service tier, service instances are operated on behalf of a single client (consume or builder) in a single tenant application.

For a builder managed service tier, the builder/seller is providing modules intended to create resources in the builder stack, that will provide common services for use by multiple buyers that the builder supports. Therefore, any services are multi-tenant. A solution template is used by an intermediate builder/seller or used by the originating builder/seller (instead of used by the consumer/buyer). In some embodiments, when a consumer uses an application module that depends on a builder/seller's service, the application module is tasked with configuring the seller services on behalf of the buyer. In embodiments, the client's provider network account is managed by the builder. The resources used for the deployed application may be isolated from the buyer (e.g., isolated from the solution service tier).

In some embodiments, a service may be elevated to become a centralized service that is fully managed by the service provider network (e.g., for a large number of clients that use the service). In some cases, a new feature may be added to a tier 1 service or alternatively, the new feature may be applied to an application module and deployed to client resources.

Figure 5:
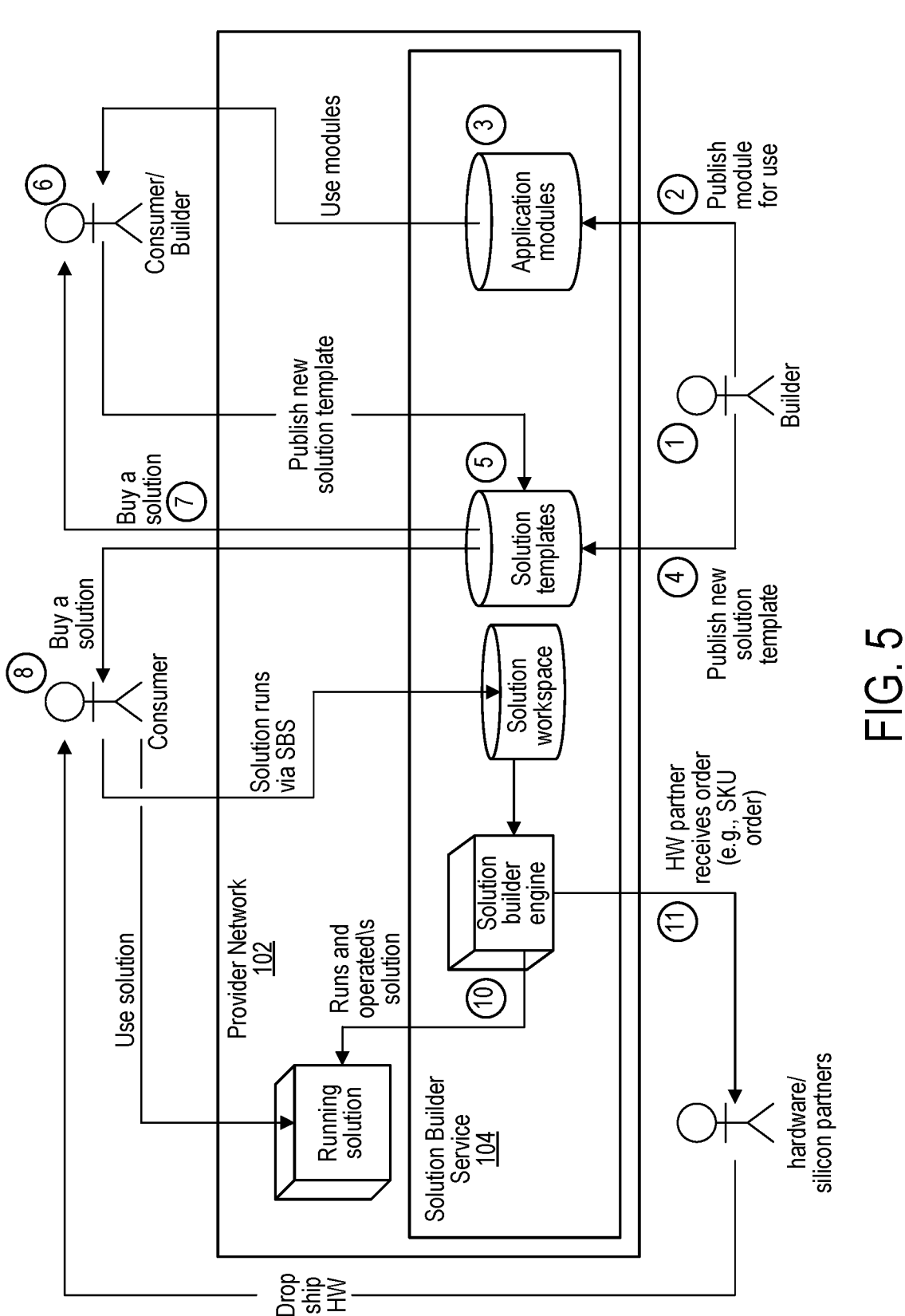
FIG. 5 is a logical block diagram illustrating a system for building modules and solution templates for application deployment and for selecting a solution template for deployment of an application, according to some embodiments.

FIG. 5 is a logical block diagram illustrating a system for building modules and solution templates for application deployment and for selecting a solution template for deployment of an application, according to some embodiments. The diagram depicts some examples of business and technology processes among clients, service providers, hardware partners, and.or buyers of application modules and/or solution templates.

In embodiments, an originating builder develops a set of services (e.g., application modules) to develop a solution, and chooses to publish these as a list of available services (e.g., published to a listing service/app that may be used as a marketplace for evaluation and/or purchase of a solution; (1)). The builder splits the solution into a set of application modules (e.g., various services, packages, components; (2)). The builder may also create modules that configure how hardware is ordered (using a module that communicates with the builder's ticketing system), and how hardware is installed (e.g., choosing to use the same ticketing system module).

The modules are initially published to the builder's application module store, and then subsequently published to the listing service/app (3). The listing service/app may be responsible for making immutable copies of all module artifacts and configurations and making them available for evaluation and/or purchase. The builder publishes top level application modules as self-contained solutions, applying default rights and/or constraints, such as to deny other builders from decomposing the module or viewing module code (4). In embodiments, the self-contained solutions may be made available to the listing service/app in the same way as application modules are, with broader visibility focused on solution buyers (5).

An intermediate buyer/builder purchases (e.g., obtains) some of the application modules to repurpose into their own solution template or application modules. In embodiments, purchasing the application module essentially purchases an entitlement to use and/or or customize the application module. In embodiments, the application module physically does not need to be copied; only references and entitlements need to be manipulated (6).

In some embodiments, the originating builder or intermediate builder may also purchase SaaS solutions or use their own private solution templates to synthesize and replicate services that will be used by their customers (7). This may use the solution builder service/engine as described in steps below. A buyer may obtain/purchase a solution (8). In embodiments, this may include purchasing an entitlement to use and/or customize the solution. The buyer may then configure the solution (9). When the buyer wishes to create an instance (e.g., synthesis), the solution builder engine/ service consumes the configuration out of the solution workspace, the solution templates, and application modules (10).

In various embodiments, there are manual steps, including hardware purchase orders and/or installation orders; these may be delegated to a builder or partner ticketing system or automated purchase system, to fulfill the order (11). The builder/partner fulfills the manual steps physically, such as drop-shipping the hardware and/or installing the hardware (12). Once the workflow is completed, the buyer is notified and/or the buyer may use the solution (e.g., the deployed application).

Figure 6:
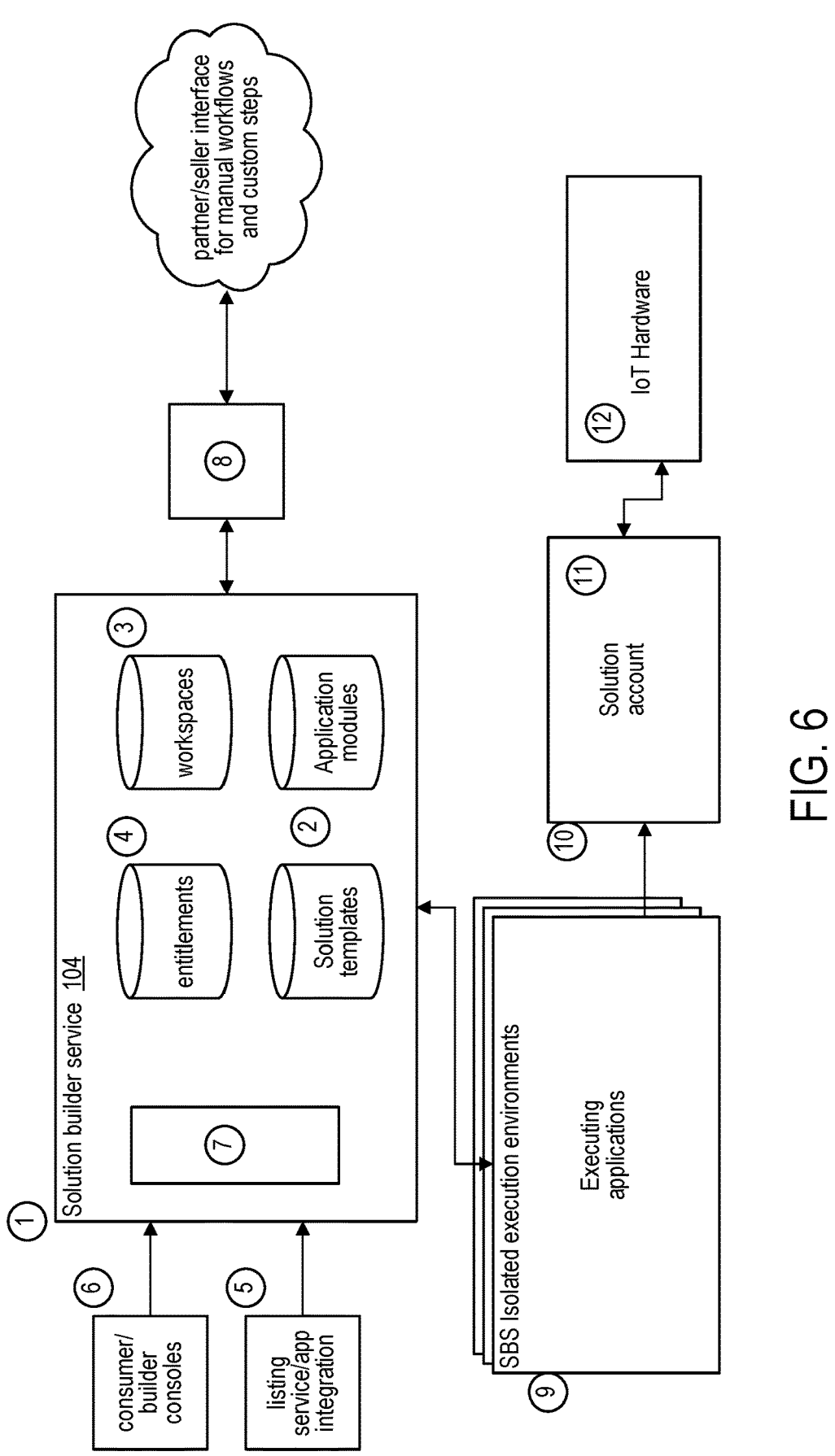
FIG. 6 is a logical block diagram illustrating a system for building modules and solution templates for application deployment and for selecting a solution template for deployment of an application, according to some embodiments.

FIG. 6 is a logical block diagram illustrating a system for building modules and solution templates for application deployment and for selecting a solution template for deployment of an application, according to some embodiments. The diagram depicts an example of a design/architecture of the components running in the service provider's technical infrastructure that together may deliver the functionalities to create and use application modules and solution templates.

The solution builder service may be used to build application modules and solution templates for application deployment as well as to allow a client to select a solution template for deployment of an application (1). In embodiments, application modules are stored by the service and are isolated from the builder client and consumer/buyer client (2). They may include a configuration file (e.g., YAML or JSON) and/or a set of artifacts (e.g., code/library package, etc.). In some embodiments, an application module may only be downloaded if permitted to the client by license/ access right; otherwise, they may be configured and applied to a solution.

In some embodiments, when a solution has been obtained/ purchased, it may be done using a logical solution "workspace" environment (which may be implemented by the solution builder service, in embodiments; (3)). In embodiments, entitlements may perform licensing/assignment of rights for clients and/or for modules/solution templates (e.g., view source code, reconfigure application module; (4)).

In the depicted example, the solution builder service interfaces with the listing service/app integration to permit the listing of solutions and/or modules, and relies on the listing service/app for the granting/sale of entitlements/ rights (5). In various embodiments, the consumer/builder consoles may allow (6), for a builder client or consumer client, one or more of: listing of created/purchased solutions, listing of purchased/created modules when purchased or created independent of the solution, Creation of a workspace from the solution, or creation of a blank workspace, listing and configuration of workspaces, execution of workspace workflows (e.g., to synthesize or modify services, or purchase or install hardware), monitoring progress of workspace workflows, creation of a new solution from purchased modules, editing of a purchased solution to the depth permitted via rights management, import of a module from source, download of a module in source form if permitted by rights management, import of a solution configuration from source, download of a solution configuration in source form if permitted by rights management, import of a workspace configuration from source, download of a workspace configuration, assignment of rights on a module, and sale of a module via marketplace.

In the example embodiment, when executing a workflow, the workflow may be inferred from data stored in the solution templates, application modules, and/or workspaces (7). In embodiments, the data may be transformed into one or more functions and executed (e.g., using a service of the provider network). Some steps may require interaction with one or more partner/seller provided services (e.g., ordering hardware; (8)). In some embodiments, this is achieved using a defined set of messages of a messaging/notification service.

In the depicted example, the solution builder service manages "disposable" isolated execution environments to execute workflow steps (9). These environments protect the solution builder service from potentially malicious CDK or other modules and/or may provide rights management for protected portions of modules by isolating them out of a solution account (10). In embodiments, the solution account is the target account for persistent resources and/or may allow for temporary resources created in the isolated execution environment.

In embodiments, device OTA images and/or software components to be used on edge devices may be managed in context of the solution account (11). In some embodiments, when a device initially connects to the provider network/cloud (e.g., with a claim certificate or other means), one or more of the software components/images in the solution account will be installed (12).

Figure 7:
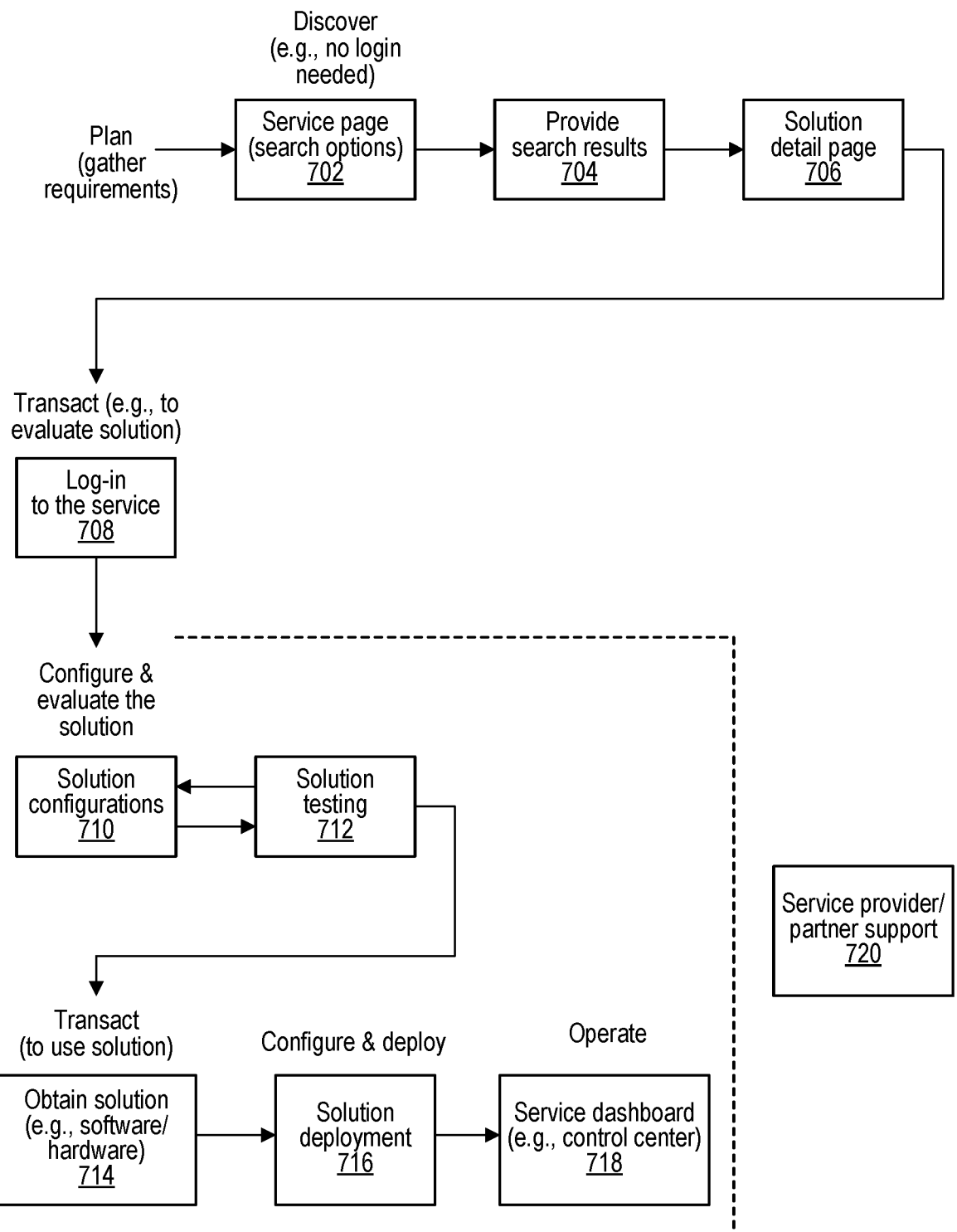
FIG. 7 is a high-level flowchart illustrating various methods and techniques for building modules and solution templates for application deployment and for selecting a solution template for deployment of an application, according to some embodiments.

FIG. 7 is a high-level flowchart illustrating various methods and techniques for selecting a solution template for deployment of an application, according to some embodiments.

In embodiments, a consumer client creates a plan for a solution for their system, which may include gathering/determining any number of requirements to implement the desired solution. At block 702, the client access a page/interface of the solution builder service in order to search for options to implement their solution. In embodiments, the client does not need to login to the service.

At block 704, the service provides search results to the client (e.g., a list of solutions/solution templates via the management interface). At block 706, the client may select a particular solution/template to view various details regarding the solution/template (e.g., which application modules are used, required hardware/edge devices). At block 708, the client logs into the service in order to begin the process of evaluating/testing a solution.

At block 710, the client configures the solution/template and the solution/application is deployed to some test resources (e.g., to the client's test resources/environment). At block 712, the client uses/tests the deployed solution/application. For example, the client may configure and run a series of small-scale tests to check the viability and compatibility of the solution with the client's system.

At block 714, the client obtains the solution (e.g., any software and/or hardware needed to fully implement the solution at the desired scale). At block 716, the client configures the solution/template and/or the software/hardware that will be needed to implement the solution (e.g., after receiving the hardware needed). At block 718, the client operates/manages the deployed solution/application using a service dashboard/control center (e.g., via the management interface). At block 720, the service provider network and/or partners may provide support to the client (e.g., in response to support requests from the client).

FIG. 8 is a high-level flowchart illustrating various methods and techniques for building modules and solution templates for application deployment, according to some embodiments.

At block 802, the service receives, from a client (e.g., a builder), software code (e.g., software packages) to be included in an application module. At block 804, the service generates an application module based on the code provided by the client. At block 806, the service validates the application code. At block 808, the service adds the application module to the catalog. In embodiments, after the module has been added to the catalog, then any number of the other clients of the service may use the service to build solution templates that include the newly added module, as described herein.

At block 810, the service receives, from the client, a solution template. The solution template may indicate the added module and/or any other application modules available to the client in the catalog (e.g., modules that were added by the client and/or other builder clients). At block 812, the service validates the solution template. At block 814, the service adds the solution template to the catalog. In embodiments, after the solution template has been added to the catalog, then the solution template is available to any number of the other consumer clients of the service for selection and/or deployment of an application, as described herein.

In various embodiments, an application module may be created from underlying software, which is packaged as a module using an integration format that allows ease of interoperability among other modules. After the application module is created/packaged, the module is added to the catalog. In embodiments, the software code of an application module or solution template defines the configuration of the service provider network's infrastructure, providing any necessary compute, storage, and/or communication functionality needed to implement a stated/desired outcome of the application module or solution template.

In embodiments, validation of an application module or solution template may ensure that the application module or solution template confirms to a set of operational conditions (e.g., a particular format that defines the module, a particular format that defines the software code against provider network's services, a particular format that defines the requirements to provided in a catalog/marketplace, format/rules that define a regulation, etc.). In embodiments, a builder can create/validate/add to a catalog new modules and/or new solution templates that include any number of the modules from the catalog.

In various embodiments, any number of different types of access rights/permissions may be configured/applied for one or more individuals or groups. For examples, a builder may indicate, for a particular application module or solution template, permission for a client to view, copy, change (e.g., alter functionality from a published state), and/or extend (e.g., make derivatives). As described herein, support requests may be routed from a consumer client to a builder client. For example, a builder client may receive, from a consumer client, a support request for an application (e.g., an application that was deployed to the consumer client's resources using one or more modules that were originally created by the builder client and added to the catalog or to a solution template used to deploy the application). The solution builder service may route the support request from the consumer client to the builder client.

Figure 9:
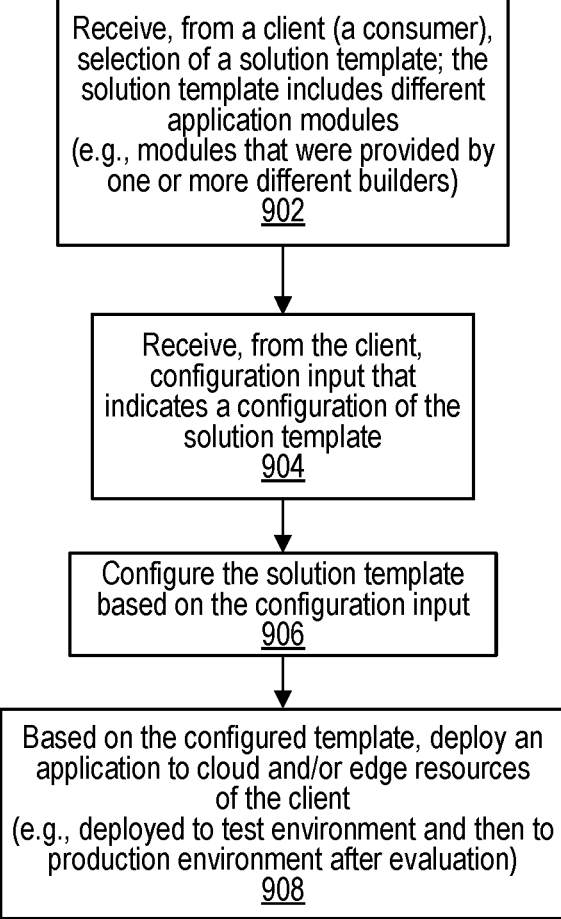
FIG. 9 is a high-level flowchart illustrating various methods and techniques for selecting a solution template for deployment of an application, according to some embodiments.

FIG. 9 is a high-level flowchart illustrating various methods and techniques for selecting a solution template for deployment of an application, according to some embodiments.

At block 902, the service receives, from a client (e.g., a consumer client), selection of a solution template; the solution template may include different application modules (e.g., modules that were provided by one or more different builder clients). At block 904, the service receives, from the client, configuration input that indicates a configuration of the solution template. At block 906, the service configures the solution template based on the configuration input. At block 908, based on the configured template, the service deploys an application to any number of cloud and/or edge resources of the client.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors.

The program instructions may implement the functionality described herein (e.g., the functionality of the service, other services, software, edge devices, and any other components/devices that implement the techniques described herein). The various methods as illustrated in the figures and described herein represent example embodiments of methods. The order of any method may be changed, and various elements may be added, reordered, combined, omitted, modified, etc.

Figure 10:
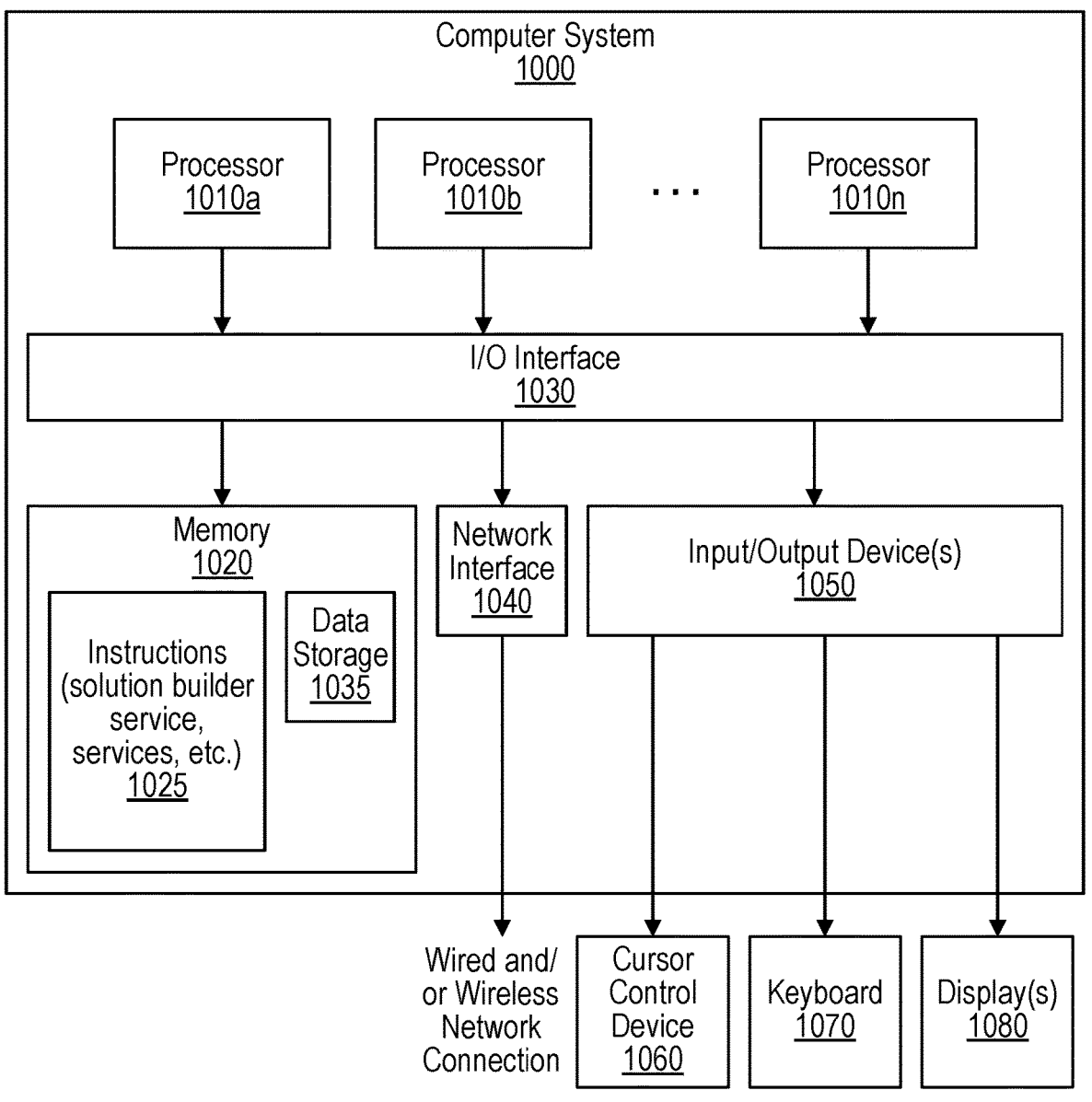
FIG. 10 is a block diagram illustrating an example computing system, according to some embodiments.

Embodiments to implement building modules and solution templates for application deployment and for selecting a solution template for deployment of an application as described herein may be executed on one or more computer systems, which may interact with various other systems or devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment.

In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, ARM, RISC-V, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms.

For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment. In some embodiments, the at least one processor 1010 may include one or more FPGAs (field programmable gate array). For example, one or more FPGAs may be used alongside one or more CPUs (as the control plane) in order to add more compute functionality and/or compute capacity.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory.

In the illustrated embodiment, program instructions and data implementing desired functions, such as those described above (e.g., the provisioning service, other services, software, and any other components/devices, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000.

A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010).

In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., fiducial markers, registry, client certificates, credentials, software, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors and one or more memories, wherein the one or more memories have stored thereon instructions, which when executed by the one or more processors, cause the one or more processors to implement a solution builder service for a plurality of clients of a provider network, wherein the solution builder service is configured to, for a given client:

receive, from the client, software code to be included in an application module;

generate an application module based on the software code provided by the client;

validate the application module;

subsequent to the validation of the application module, add the application module to a catalog, wherein the catalog comprises application modules and solution templates from different clients that have been validated by the solution builder service;

receive, from the client, a solution template, wherein the solution template indicates a plurality of the application modules of the catalog, and wherein the plurality of application modules of the catalog that are indicated by the solution template received by the solution builder service from the client comprises the application module that was previously added to the catalog by the solution builder service based on the software code previously received by the solution builder service from the client, and wherein the plurality of application modules respectively comprise software code;

validate the solution template; and subsequent to the validation of the solution template, add the solution template to the catalog, wherein the solution template is available for selection from the catalog for use at least by one or more of the plurality of clients of the solution builder service other than the client.

2. The system as recited in claim 1, wherein the solution builder service is further configured to:

receive, from the client, an indication that the application module is to be rights managed, wherein at least one type of access right is to be assigned for the application module by the client.

3. The system as recited in claim 1, wherein the solution builder service is further configured to:

receive, from another client, software code to be included in another application module;

validate the other application module; and subsequent to the validation of the other application module, add the other application module to the catalog.

4. The system as recited in claim 3, wherein the solution builder service is further configured to:

receive, from the other client, another solution template, wherein the other solution template indicates the application module and the other application module;

validate the other solution template; and subsequent to the validation of the other solution template, add the other solution template to the catalog.

5. The system as recited in claim 1, wherein the solution builder service is further configured to:

receive, from another client, a request for deployment of the solution template; and based on the solution template, deploy an application to resources of the other client.

6. A method, comprising:

performing, by one or more computing devices of a provider network that implement a solution builder service:

receiving, from a client, a solution template, wherein the solution template indicates a plurality of application modules of a catalog, wherein the catalog comprises application modules and solution templates from different clients, and wherein at least one of the plurality of application modules of the catalog that are indicated by the solution template received by the solution builder service from the client was previously added to the catalog by the client or another client of the solution builder service based on input previously received by the solution builder service from the client or the other client, and wherein the plurality of application modules respectively comprise software code;

validating the solution template; and subsequent to the validation of the solution template, adding the solution template to the catalog, wherein the solution template is available for selection from the catalog for use by one or more of a plurality of other clients of the solution builder service.

7. The method as recited in claim 6, further comprising:

receiving, from the client or the other client, software code to be included in at least one application module;

validating the at least one application module; and subsequent to the validation of the at least one application module, adding the at least one application module to the catalog.

8. The method as recited in claim 6, further comprising:

receiving, from the client, an indication that the solution template is to be rights managed, wherein at least one type of access right is to be assigned for the solution template by the client.

9. The method as recited in claim 6, wherein one of the application modules of the solution template includes software code that was provided by another client, and wherein the application module was assigned one or more types of access rights by the other client.

10. The method as recited in claim 6, wherein one of the application modules of the solution template is a prebuilt application module provided by the solution builder service.

11. The method as recited in claim 6, further comprising:

receiving, from another client, a different solution template, wherein the different solution template indicates an application module previously added to the catalog by the client and a different application module not included in the solution template.

12. The method as recited in claim 6, further comprising:

receiving, from another client, a request for deployment of the solution template; and based on the solution template, deploying an application to resources of the other client.

13. The method as recited in claim 6, wherein deploying the application comprises:

deploying one or more of the plurality of application modules to a plurality of edge devices of a remote network of the other client.

14. The method as recited in claim 6, wherein receiving the solution template comprises:

providing, to the client, a graphical user interface (GUI), wherein the GUI provides an indication of the plurality of application modules, and receiving, from the client, input that indicates relationships between different ones of the plurality of application modules.

15. One or more non-transitory computer-accessible storage media storing program instructions that when executed on or across one or more processors of an edge device of a network of a client cause the one or more processors to implement a solution builder service to:

receive, from a client, a solution template, wherein the solution template indicates a plurality of application modules of a catalog, wherein the catalog comprises application modules and solution templates from different clients, and wherein at least one of the plurality of application modules of the catalog that are indicated by the solution template received by the solution builder service from the client was previously added to the catalog by the client or another client of the solution builder service based on input previously received by the solution builder service from the client or the other client, and wherein the plurality of application modules respectively comprise software code;

validate the solution template; and subsequent to the validation of the solution template, add the solution template to the catalog, wherein the solution template is available for selection from the catalog for use by one or more of a plurality of other clients of the solution builder service.

16. The one or more storage media as recited in claim 15, wherein the program instructions when executed on or across the one or more processors further cause the one or more processors to:

receive, from the client or the other client, software code to be included in at least one application module;

validate the at least one application module; and subsequent to the validation of the at least one application module, add the at least one application module to the catalog.

17. The one or more storage media as recited in claim 15, wherein the program instructions when executed on or across the one or more processors further cause the one or more processors to:

receive, from the client, an indication that the solution template is to be rights managed, wherein at least one type of access right is to be assigned for the solution template by the client.

18. The one or more storage media as recited in claim 15, wherein the program instructions when executed on or across the one or more processors further cause the one or more processors to:

receive, from another client, a request for deployment of the solution template; and based on the solution template, deploy an application to resources of the other client.

19. The one or more storage media as recited in claim 18, wherein the program instructions when executed on or across the one or more processors further cause the one or more processors to:

receive, from the other client, a support request for the application; and route the support request for the application to the client.

20. The one or more storage media as recited in claim 18, wherein the program instructions when executed on or across the one or more processors further cause the one or more processors to:

receive performance metrics for the application; and route the performance metrics to the client.

* * * * *